United States Patent [19]

Gardei

[11] Patent Number: 4,989,174

[45] Date of Patent: Jan. 29, 1991

[54] FAST GATE AND ADDER FOR MICROPROCESSOR ALU

[75] Inventor: William F. Gardei, Downingtown, Pa.

[73] Assignee: Commodore Business Machines, Inc., West Chester, Pa.

[21] Appl. No.: 263,570

[22] Filed: Oct. 27, 1988

[51] Int. Cl.$^5$ .............................................. G06F 7/50
[52] U.S. Cl. ......................................................... 364/786
[58] Field of Search .............................. 364/784–786; 371/36

[56] References Cited

U.S. PATENT DOCUMENTS

| | | | |
|---|---|---|---|
| 4,132,975 | 1/1979 | Koike | 371/36 |
| 4,330,841 | 5/1982 | Yamada et al. | 364/786 |
| 4,686,676 | 8/1987 | McPherson | 371/36 |

Primary Examiner—Dale M. Shaw
Assistant Examiner—Long T. Nguyen
Attorney, Agent, or Firm—Panitch, Schwarze, Jacobs & Nadel

[57] ABSTRACT

A fast logic gate wherein the gate output assumes a first binary state when two or more of the gate inputs assume the same predetermined binary states and wherein the gate output assumes a second binary state otherwise. The delay in propagating the gate output based on a transition at a predetermined one of the gate inputs is relatively small. In a preferred application, the gate is utilized in a microprocessor ALU, more particularly, the portion of each adder bit which generates the carry output, and the predetermined gate input is the carry input of the adder bit. The microprocessor can therefore execute instructions which involve addition or subtraction operations, such as relatively addressing instructions, much more quickily.

6 Claims, 4 Drawing Sheets

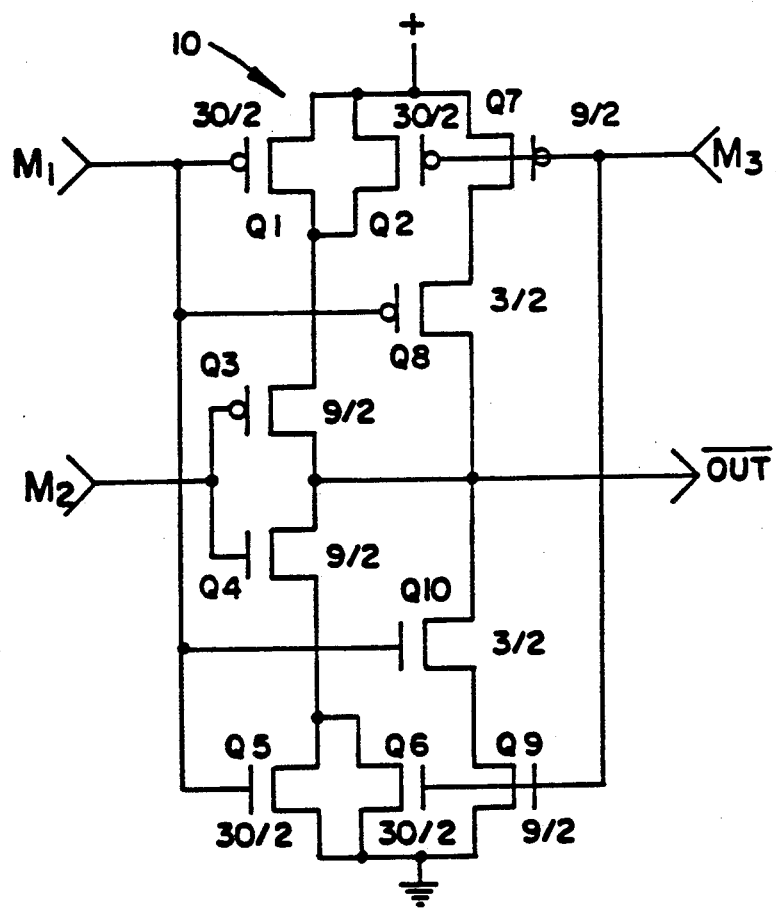
FIG. 1
| $M_1$ | $M_2$ | $M_3$ | $\overline{OUT}$ |
|---|---|---|---|
| 0 | 0 | 0 | 1 |
| 1 | 0 | 0 | 1 |
| 0 | 1 | 0 | 1 |
| 0 | 0 | 1 | 1 |
| 1 | 1 | 0 | 0 |
| 1 | 0 | 1 | 0 |
| 0 | 1 | 1 | 0 |
| 1 | 1 | 1 | 0 |
FIG. 2
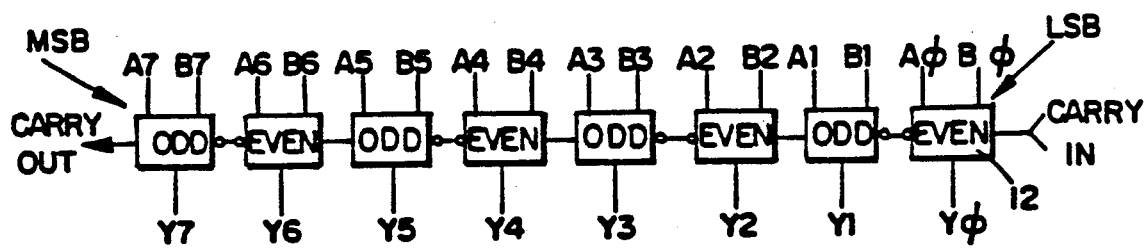
FIG. 3

FAST GATE AND ADDER FOR MICROPROCESSOR ALU

FIELD OF THE INVENTION

The field of the invention is the circuit design of a fast logic gate and the use of such a gate in the adder of the arithmetic logic unit (ALU) of a microprocessor.

BACKGROUND OF THE INVENTION

The speed of execution by a microprocessor of an instruction requiring an addition or subtraction is limited by the speed of operation of the adder within the ALU. The adder is primarily limited in speed by the propagation delay between the carry input of the least significant bit (LSB) of the adder to the carry output of the most significant bit (MSB) of the adder. Thus, the carry in to carry out propagation delays across the bits of the adder are cumulative whereby the carry in to carry out path is said to constitute the "worst case" path for propagation delay. In contrast, the propagation delay from the inputs of each adder bit to the sum output of the bit is not cumulative and, accordingly, does not pose the same delay problem.

Due to the cumulative effect of the propagation delays between the carry in and carry out lines of the adder bits, the execution of a microprocessor instruction which requires an addition or subtraction operation typically requires an extra or so-called "dead" machine cycle.

The problem solved by the present invention is that of accelerating the speed at which the ALU adder operates so as to eliminate the need for a "dead" cycle in executing microprocessor instructions.

SUMMARY OF THE INVENTION

A fast logic gate comprising three or more inputs and an output. The output assumes a first binary state if a majority of the inputs assume identical predetermined binary states. Otherwise, the output assumes a second binary state. A propagation delay is associated with each input. The propagation delay associated with a predetermined one of the inputs is substantially less than the propagation delay associated with any of the other inputs.

In the preferred embodiment, the propagation delay associated with the predetermined input is at most ½ the propagation delay associated with any other input.

In the preferred application, the fast logic gate is utilized in the adder portion of a microprocessor ALU. The logic gate is coupled at its input side to first and second addend bit inputs and a carry input such that the aforementioned predetermined input is the carry input. The logic gate is coupled at its output side to a carry output.

For the purpose of illustrating the invention, there is shown in the drawings forms which are presently preferred; it being understood, however, that this invention is not limited to the precise arrangements and instrumentalities shown.

BRIEF DESCRIPTION OF THE DRAWINGS

FIG. 1 is a circuit schematic showing the layout of a fast logic gate according to the present invention.

FIG. 2 is a truth table for the circuit shown in FIG. 1.

FIG. 3 is a block diagram of a multiple bit adder.

DETAILED DESCRIPTION OF THE PREFERRED EMBODIMENTS

Figure 4:
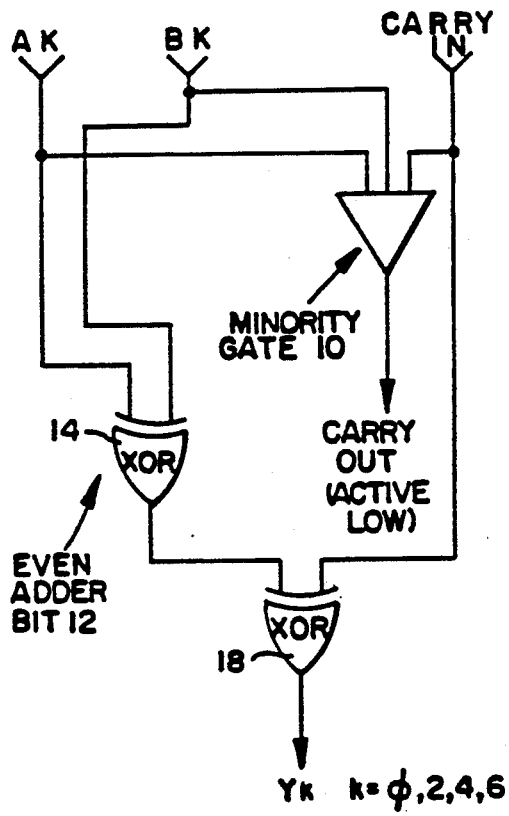
FIG. 4 is a logic circuit diagram for an "even" adder bit according to the present invention.

Referring to the drawings, wherein like numeral indicate like elements, there is shown in FIG. 1 a circuit schematic of the fast logic gate of the present invention which is a "minority" logic gate and is generally designated as 10. Logic gate 10 comprises a pair of parallel connected p-channel FETs Q1, Q2 series connected to a pair of series connected FETs Q3, Q4. FET Q3 is a p-channel FET. FET Q4 is a n-channel FET. A pair of parallel connected (n-channel) FETs Q5, Q6 is connected to FETs Q3, Q4. The sources of FETs Q1, Q2 are connected to the supply (+) and to the source of a FET Q7. FET Q7 is series connected to FET Q8 whose gate is coupled to the gate of FET Q1. FETS Q7 and Q8 are p-channel FETs. The sources of FETs Q5, Q6 are connected to common and to the source of FET Q9. FET Q9 is series connected to FET Q10 whose gate is coupled to the gate of Q5. FETs Q9 and Q10 are n-channel FETs. The drains of FETs Q8, Q10 are connected to each other and to the drains of FETs Q3, Q4 thereby forming the output terminal OUT for the gate 10. The gates of FETs Q3, Q4 are coupled together to form the input terminal M2 of the gate. The gates of FETs Q2, Q6, Q7 and Q9 are coupled together to form the input terminal M3 of the gate. The gates of FETs Q1, Q8, Q10 and Q5 are coupled together to form the input terminal M1 of the gate.

In the preferred embodiment described herein, the width and length of each FET gate is specified in FIG. 1 as "width/length". For example, the width of gate Q1 is 30 microns and the length is 2 microns. The gate width and length determine the FET on-channel resistance. Propagation delay through the FET is directly proportional to FET on-channel resistance. As shown in FIG. 1, all gates are 2 microns long. The higher the gate width, then, the lower the FET on-channel resistance and the lower the propagation delay across the path including the FET.

The truth table or logic operation of the circuit of FIG. 1 is shown in FIG. 2. As can be seen from FIG. 2, the complement of the gate output OUT is at binary "1" when the majority of inputs, i.e., two or more inputs (M1, M2, M3), are at binary "1", and the complement of the output is binary "0" otherwise.

A propagation delay associated with an input in the circuit shown in FIG. 1 is the time taken for a transition to appear at the OUT terminal in response to a transition at the input terminal when either one (not both) of the other input terminals is at a logic "1". Thus, the delay is measured assuming that one and only one of the other inputs is already at a logic "1" level. The conductive paths associated with each pair of binary "1" inputs in the circuit of FIG. 1 are: Q4, Q5, OUT for binary "1"s at M1, M2; or Q9, Q10, OUT for binary "1"s at M1, M3; or Q4, Q6, OUT for binary "1"s at M2, M3.

When all inputs M1-M3 are at binary "1", the path is Q5-Q6 (shunt), Q4, OUT in shunt with Q9, Q10, OUT. In FIG. 1, the propagation delay associated with a transition at the M2 input (assuming a logic "1" at the M1 or M3 input) is shorter than the delay associated with a transition at any other input. For the gate dimensions specified in FIG. 1, the propagation delay associated with the M2 input is at most one-third the delay associated with any other input.

Referring to FIG. 3, there is shown a conventional multiple bit adder configuration for performing the addition of bits A0-A7 and B0-B7. The adder is divided into "odd" and "even" bits beginning with an "even" adder bit as the LSB (A0, B0). The sum of each pair of corresponding order addend bits is designated Y0, Y1 . . . Y7 in FIG. 3. The time required to generate a sum output $Y_k$ based on inputs $A_k$, $B_k$ is the same for each bit of the adder assuming no carries. The time required to produce a carry out signal at the MSB (A7, B7, Y7) is, in contrast, the sum of the times requires to generate a carry out across all eight of the adder bits. Thus, the worst case delay in the addition operation is encountered in generating the carry out signal at the MSB.

The speed of the conventional ALU, using the adder configuration shown in FIG. 3, is therefore limited by the propagation delay between the carry input of the LSB and the carry output of the MSB. As a result, the speed with which certain microprocessor instructions, such as those requiring additions or subtractions, can be executed is limited by the speed of the ALU adder. The effect is graphically illustrated in FIG. 7(a).

Figure 7A:
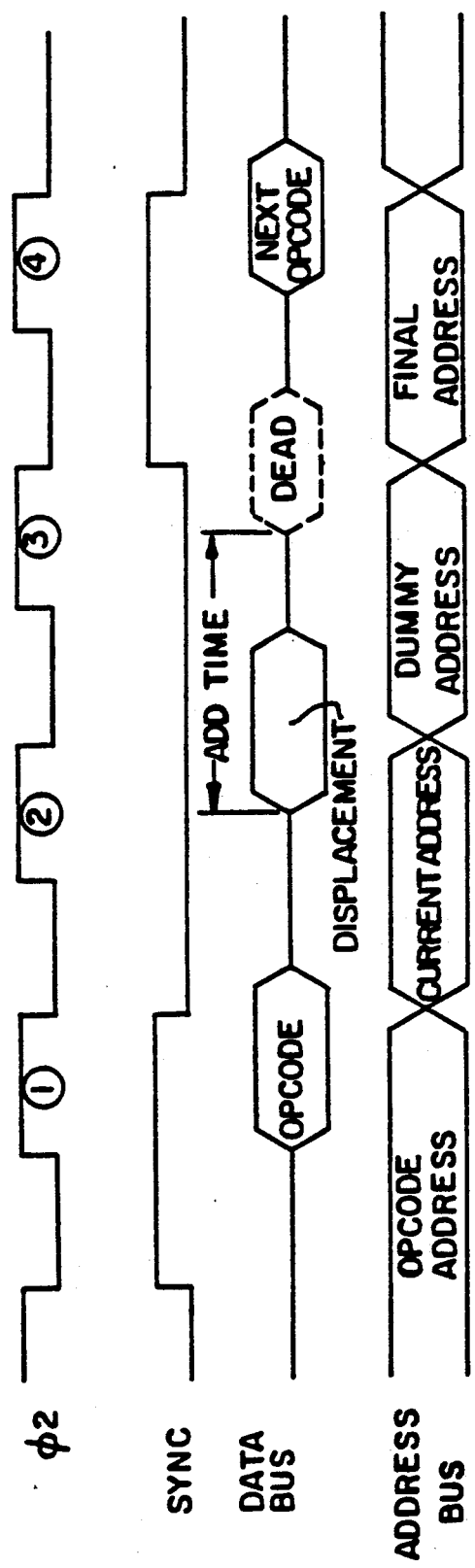
FIG. 7(a) is a diagram showing the timing for executing an instruction in connection with a prior art ALU.

In FIG. 7(a), $\phi_2$ represents clock pulses, each pulse period indicating one machine cycle. The SYNC waveform is generated by the microprocessor control unit or programmable logic array (PLA) to indicate an OP-CODE fetch. The example shown in FIG. 7(a) is a relative addressing instruction which requires addition of a current address byte and a displacement byte. The result or sum is the final address byte which is transmitted over the address bus. The appearance of the final address on the address bus, must be delayed one machine cycle—the "dead" cycle—due to the limited speed of the ALU adder in computing the sum. Since the final address byte indicates the location in memory at which the next opcode is to be fetched, the next opcode can not be fetched until after the "dead" cycle.

Figure 7B:
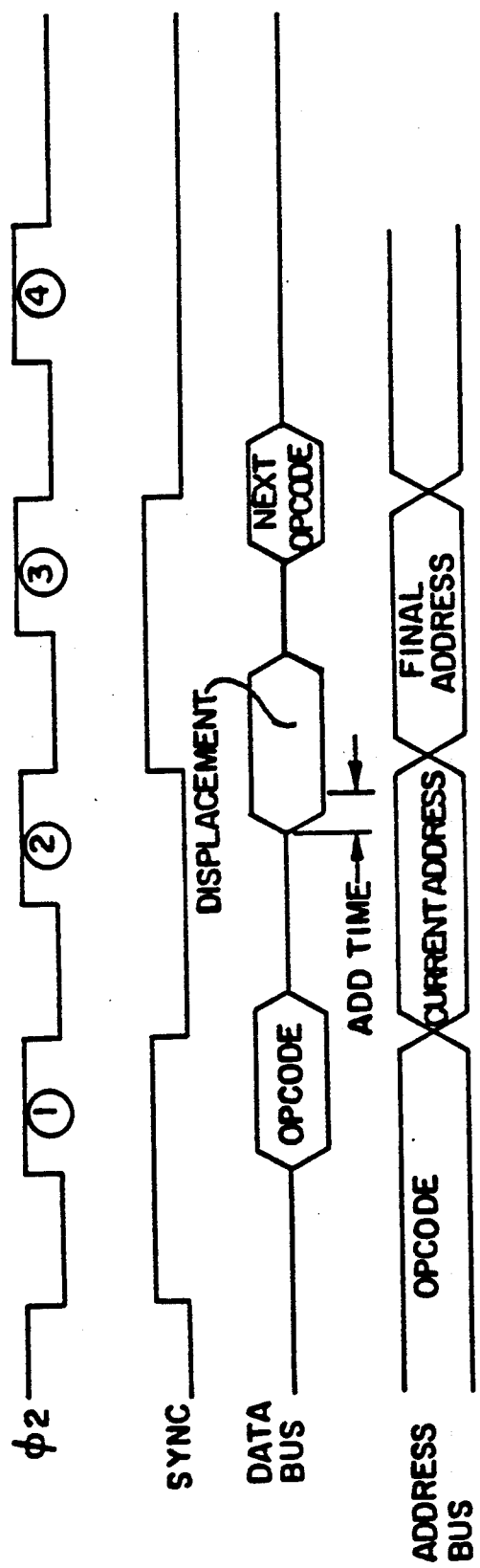
FIG. 7(b) is a diagram showing the timing for execution of an instruction using the ALU of the present invention.

If the speed of the ALU adder could be increased to perform the addition operation within a fraction of a machine cycle after transmission of the displacement byte on the data bus, the final address byte would be available in the very next machine cycle. Accordingly, the next opcode could be promptly transmitted over the data bus without waiting a "dead" cycle. This is graphically represented in FIG. 7(b). An instruction can therefore be executed in less time, specifically one machine cycle less, in the present invention.

The increase in speed of execution attained by the present invention is made possible by a commensurate decrease in propagation delay time across each adder bit (from carry in to carry out) in FIG. 3. In the present invention, particularly configured as shown in FIG. 1, with M2 being carry in and OUT being carry out, the propagation delay from carry in to carry out is at most one-third the propagation delay across a conventional adder bit, from carry in to carry out.

The logic circuit arrangement for an "even" bit in the adder of FIG. 3 is generally designated as 12 in FIG. 4. The kth bit of the A addend byte is fed to the input of an exclusive OR (XOR) gate 14 and to the gate 10. The kth bit of the B addend byte is also fed to the XOR gate and to gate 10. The carry input is fed to the gate 10 and to one input of a second exclusive OR (XOR) gate 18. The output of the XOR gate 14 is fed to the other input of XOR gate 18. The output $Y_k$ of XOR gate 18 is the sum of the $A_k$, $B_k$ and carry in bit. The output of gate 10 is the carry out bit. In the present invention, the $A_k$ bit may be the M1 input of FIG. 1, the $B_k$ bit may be the M3 input, and the carry in bit would be the M2 input. The propagation delay in generating the carry out bit based on any combination of inputs which include the carry input, i.e., ($A_k$, carry in) or ($B_k$, carry in), is therefore much less than the propagation delay encountered in a conventional adder.

Figure 5:
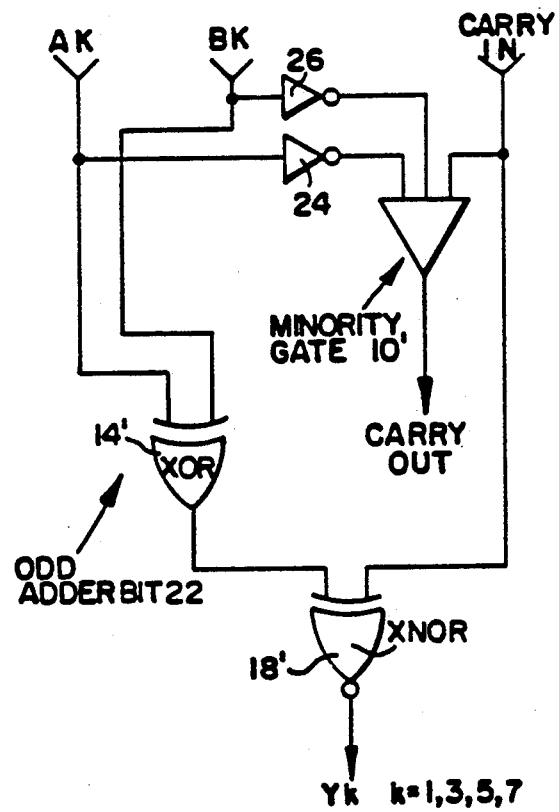
FIG. 5 is a logic circuit diagram for an "odd" adder bit according to the present invention.

Referring to FIG. 5, there is shown the logic circuit arrangement for an "odd" adder bit generally designated as 22. The "odd" adder bit 22 is identical to "even" adder bit 12 with the exception of the inverters 24, 26, which invert the Ak and Bk inputs to the gate 10', and the exclusive NOR (XNOR) gate 18' which replaces XOR gate 18. Operation of the bit is otherwise the same as already described except that carry in and carry out states complement those previously described.

Figure 6:
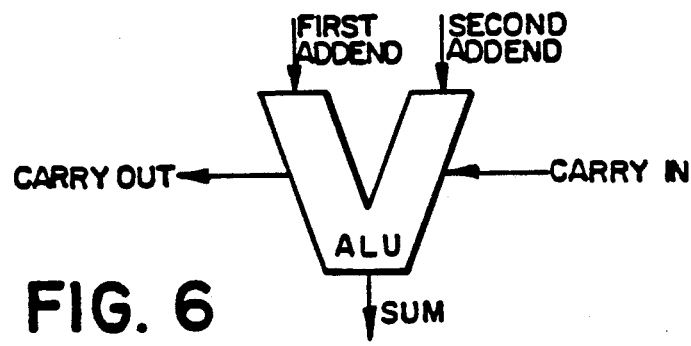
FIG. 6 is a block diagram of the ALU portion of a microprocessor.

Referring to FIG. 6, there is shown in block diagram form a portion of the microprocessor involved in executing an instruction which requires an addition or subtraction.

It should be appreciated that the invention resides in the construction and utilization of a fast logic gate which provides a substantially reduced propagation delay between a predetermined input (the carry input in the application described herein) and the gate output (the carry output in the application described herein). Use of the logic gate in each of the adder bits in a microprocessor ALU enables the ALU to perform additions or subtractions in much less time. As a result, instructions which require an addition or subtraction can be executed much more rapidly.

It should be understood that the construction of the logic gate of the present invention is not limited to p-channel or n-channel FETs or to the specific gate widths and lengths described herein. Nor is the invention limited to the particular application of the gate in each of the adder bits in an ALU, as described herein.

The present invention may be embodied in other specific forms without departing from the spirit or essential attributes thereof and, accordingly, reference should be made to the appended claims, rather than to the foregoing specification, as indicating the scope of the invention.

I claim:

1. A fast logic gate, comprising:
    first, second and third inputs and an output,
    said first input (M1) being connected to the gate terminal of a p-channel field effect transistor (FET) (Q1) having a source terminal coupled to a supply voltage and to the gate of an n-channel FET (Q5) having a source terminal coupled to ground,
    said second input (M2) being coupled to the gate terminals of a p-channel FET (Q3) and an n-channel FET (Q4), the FETs Q3 and Q4 being connected together at their drain terminals with their source terminals connected respectively to the first-mentioned p-channel and n-channel FETs (Q1 and Q5), said third input (M3) connected to the gate terminal of a p-channel FET (Q7) having a source terminal connected to the supply voltage, the third input also being connected to the gate terminal of an n-channel FET (Q9) which has a source terminal connected to ground, said first input also being coupled to the gate terminals of a p-channel FET (Q8) and an n-channel FET (Q10) whose drain terminal are coupled together and whose source terminals are respectively coupled to the drain terminals of the last-mentioned p-channel and n-channel FETs (Q7 and Q9), said third input also being coupled to the gate terminal of a p-channel FET (Q2) which is shunt connected to said first-mentioned p-channel FET (Q1) and to the gate terminal of an n-channel FET (Q6) which is shunt connected to said first-mentioned n-channel FET (Q5), and said output being coupled to the drain terminals of p-channel and n-channel FETs (Q3, Q4) and to the drain terminals of the p-channel and n-channel FETs (Q8, Q10).

2. The fast logic gate according to claim 1 wherein each of the inputs has a propagation delay comprising the time required for a transition to appear at the output in response to a transition at one input when either one of the other inputs is at a first binary state, the propagation delay of said second input (M2) being substantially less than the propagation delay of any of the other inputs.

3. An adder, comprising:
first and second addend inputs and a carry input,
a carry output and a sum output,
means for computing the binary sum of said first and second addends and the carry input and for generating a signal indicative thereof at said sum output, and
a fast logic gate for computing a carry based on said first and second addend inputs and the carry input and for generating a signal indicative thereof at said carry output, said logic gate being coupled at its input side to said first and second addend inputs and said carry input and at its output side to said carry output, each of said inputs having a propagation delay to the carry output, the propagation delay comprising the time required for a transition to appear at the carry output in response to a transition at one input when either of the other inputs is at a first binary state, means for causing said carry output to assume a first binary state if two or more of said inputs assume identical predetermined binary states and for causing said carry output to assume a second binary state otherwise, and the propagation delay of said carry input being substantially less than the propagation delay of either addend input.

4. The adder according to claim 3 wherein the propagation delay of said carry input is at most ⅓ the propagation delay of either addend input.

5. A microprocessor circuit, comprising:
an arithmetic logic unit (ALU) for adding a first addend byte and a second byte,
said ALU comprising plural adder means,
each adder means comprising a first and second addend inputs and a carry input, a carry output and a sum output, means for computing the binary sum of said first and second addends and the carry input and for generating a signal indicative thereof at said sum output, and a fast logic gate for computing a carry based on said first and second addend inputs and the carry input and for generating a signal indicative thereof at said carry output, said logic gate being coupled at its input side to said first and second addend inputs and said carry input and at its output side to said carry output, each of said logic gate inputs having a propagation delay to the carry output, the propagation delay comprising the time required for a transition to appear at the carry output in response to a transition at one input when either of the other inputs is at a first binary state, means for causing said carry output to assume a first binary state if two or more of said inputs assume identical predetermined binary states and for causing said carry output to assume a second binary state otherwise, the propagation delay of said carry input being substantially less than the propagation delay of either of the addend inputs.

6. The microprocessor circuit according to claim 5 wherein the propagation delay of said carry input is at most ⅓ the propagation delay of either of the addend inputs.

* * * * *